(12) United States Patent
Shouji et al.

(10) Patent No.: US 6,336,724 B1
(45) Date of Patent: Jan. 8, 2002

(54) PROJECTOR DEVICE CAPABLE OF OBTAINING A HIGH LUMINANCE WITHOUT INCREASING OUTPUT OF LIGHT SOURCE

(75) Inventors: Eisaku Shouji; Takayuki Matsumoto; Katsuyuki Takeuchi, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/465,581

(22) Filed: Dec. 17, 1999

(30) Foreign Application Priority Data

Dec. 18, 1998 (JP) .......................... 10-360358

(51) Int. Cl.[7] .............................. G03B 21/14
(52) U.S. Cl. ........................... 353/20; 353/94
(58) Field of Search ............................ 353/94, 20, 30; 349/5, 7, 9; 359/487, 496, 638, 630

(56) References Cited

U.S. PATENT DOCUMENTS

| | | | | |
|---|---|---|---|---|
| 5,121,983 A | * | 6/1992 | Lee | 353/20 |
| 5,359,455 A | * | 10/1994 | Oishi | 359/487 |
| 5,513,023 A | * | 4/1996 | Fritz et al. | 359/40 |
| 5,704,701 A | * | 1/1998 | Kavanagh et al. | 353/33 |
| 5,743,612 A | * | 4/1998 | Matsuda et al. | 353/94 |
| 6,036,318 A | * | 3/2000 | Itoh | 353/20 |
| 6,042,234 A | * | 3/2000 | Itoh | 353/20 |
| 6,053,615 A | * | 4/2000 | Peterson et al. | 353/20 |
| 6,075,648 A | * | 6/2000 | Yamamoto et al. | 353/20 |
| 6,108,132 A | * | 8/2000 | Itoh | 349/487 |

\* cited by examiner

*Primary Examiner*—William Dowling
(74) *Attorney, Agent, or Firm*—Michael Best & Friedrich LLP; J. Warren Whitesel

(57) ABSTRACT

In a projector device for magnifically projecting onto a screen a beam of light emitted from a light source which is irradiated at a mirror reflecting type light modulator after being color-separated into light beams of three primary colors and after respective light beams of primary colors modulated in the mirror reflecting type light modulator are synthesized by a color prism, a light beam emitted from a first light source is polarized into an "p" polarization by a polarization converter and a light beam emitted from a second light source is polarized into a "s" polarization by the polarization converter, thereby both light beams are synthesized by a polarization beam splitter.

9 Claims, 4 Drawing Sheets

PROJECTOR DEVICE CAPABLE OF OBTAINING A HIGH LUMINANCE WITHOUT INCREASING OUTPUT OF LIGHT SOURCE

BACKGROUND OF THE INVENTION

The present invention relates to a projector device and particularly to a projector device using a DMD (Mirror Reflection Type Light Modulator).

The projector device using the conventional DMD will be described hereinafter with reference to the drawings. FIG. 1 is a diagram for typically describing a structure of the conventional projector device. As shown in FIG. 1, a light beam emitted from a light source 101 is reflected by an ellipsoidal mirror 102 and condensed into a rod integrator 106 and, thereafter, irradiated at a DMD 108 through a relay lens 104, a reflecting mirror 105, a reflecting prism 106 and a color prism 107. The light beam reflected by the DMD 108 is magnified by the color prism 107 and the reflecting prism 106 and then projected onto a screen 110.

In case of the conventional system as described above, it is necessary to increase an output of the light source 101 to obtain a high luminance. If the output of the light source 101 is increased, however, consumption power is also increased with a result that a larger power source for lamp is required.

SUMMARY OF THE INVENTION

It is therefore an object of the present invention to provide a projector device which is capable of obtaining a high luminance without increasing the output of the light source.

Other objects of the present invention will become clear as the description proceeds.

To achieve the above described object in the projector device for magnifically projecting onto a screen a beam of light emitted from a light source which is irradiated at a mirror reflection type light modulator after being color-separated into light beams of three primary colors and after respective light beams of primary colors modulated in the mirror reflection type light modulator are synthesized by said color prism, the present invention has, in a first viewpoint, two light source systems. A light beam of one light source is polarized into a light beam composed of a single polarization component by a polarization converter constructed by a polarization plate and a phase difference plate opposed to each other. A light beam of another light source is polarized into a light beam which is 90° different in a polarization direction from the light beam of said one light source, thereby light beams of said two light sources are synthesized by a polarization beam splitter.

In a second viewpoint, in the projector device for magnifically projecting onto a screen a beam of light emitted from a light source which is irradiated at a mirror reflection type light converter after being color-separated into light beams of three primary colors by a color prism and after respective light beams of primary colors modulated in the mirror reflection type light converter are synthesized, the present invention at least comprises: two light sources; a polarization converter for polarizing light beams of respective light sources; and a polarization beam splitter for synthesizing polarized light beams of respective light sources. A light beam emitted from a first light source transmits through said polarization beam splitter after being polarized into a "p" polarization by said polarization converter. A light beam emitted from a second light source is reflected by said polarization beam splitter after being polarized into a "s" polarization by said polarization converter, thereby light beams emitted by the two light sources are synthesized.

Further, in a third viewpoint, in the projector device for magnifically projecting onto a screen a beam of light emitted from a light source which is irradiated at a mirror reflection type light modulator after being color-separated into light beams of three primary colors and after respective light beams of primary colors modulated in the mirror reflection type light modulator are synthesized, the present invention at least comprises: two light sources; two luminance regulators for equalizing the luminance of light flux of respective light sources; two polarization converters for polarizing light beams of respective light sources; and a polarization beam splitter for synthesizing polarized light beams of respective light sources. A light beam emitted from a first light source becomes an uniform light flux in a first luminance regulator and transmits through said polarization beam splitter after being polarized into a "p" polarization by a first polarization converter. A light beam of a second light source becomes an uniform light flux in a second luminance regulator and is reflected by said polarization beam splitter after being polarized into a "s" polarization by a second polarization converter, thereby light beams emitted from the two light sources are synthesized.

Furthermore, in a fourth viewpoint, in the projector device for magnifically projecting onto a screen a beam of light emitted from a light source which is irradiated at a mirror reflection type light converter after being color-separated into light beams of three primary colors and after respective light beams of primary colors modulated in the mirror reflection type light modulator are synthesized, the present invention at least comprises: two light sources; two lens portions for making light beams of respective light sources into collimated light beams; two luminance regulators for equalizing the luminance of light flux of respective light sources; and a polarization beam splitter for synthesizing polarized light beams of respective light sources. A light beam emitted from a first light source and changed into a collimated light beam in a first lens portion becomes an uniform light flux in a first luminance regulator and transmits through said polarization beam splitter and is output from a second light source after being polarized into a "p" polarization by a first polarization converter. A light beam emitted from a second light source and changed into a collimated light beam becomes an uniform light beam in a second luminance regulator and is reflected by said polarization beam splitter after being polarized into a "s" polarization by a second polarization converter, thereby light beams emitted from the two light sources are synthesized.

It is preferable for the present invention that said polarization converter is constructed by a polarization plate and a phase difference plate opposed to each other and that said luminance regulator comprises fly's eye lenses constructed by a number of lens elements.

Since, by the above structure, the present invention polarizes the light beams emitted from the two light sources into a "p" polarization and a "s" polarization respectively by a polarization converter and thereafter, synthesize them by a polarization beam splitter, the light beams emitted from the two light sources can be projected onto a screen without attenuation.

DETAILED DESCRIPTION OF THE PREFERRED EMBODIMENTS

In one preferred embodiment of the projector device according to a first embodiment of the present invention for magnifically projecting onto a screen a beam of light emitted from a light source which is irradiated at a mirror reflection type light modulator after being color-separated into light beams of three primary colors and after respective light beams of primary colors modulated in the mirror reflection type light converter are synthesized by a color prism, a light beam emitted from a first light source (1a of FIG. 2) is polarized into a "p" polarization by a polarization converter (5 of FIG. 2) and a light beam emitted from a second light source is polarized into a as "s" polarization by the polarization converter (6 of FIG. 2), and both light beams are synthesized by a polarization beam splitter.

To describe further in detail about the first embodiment of the present invention as described above, the example thereof will be described herein-after with reference to the drawings.

First, the projector device according to the first embodiment of the present invention will be described with reference to FIG. 2 to FIG. 4.

Figure 1:
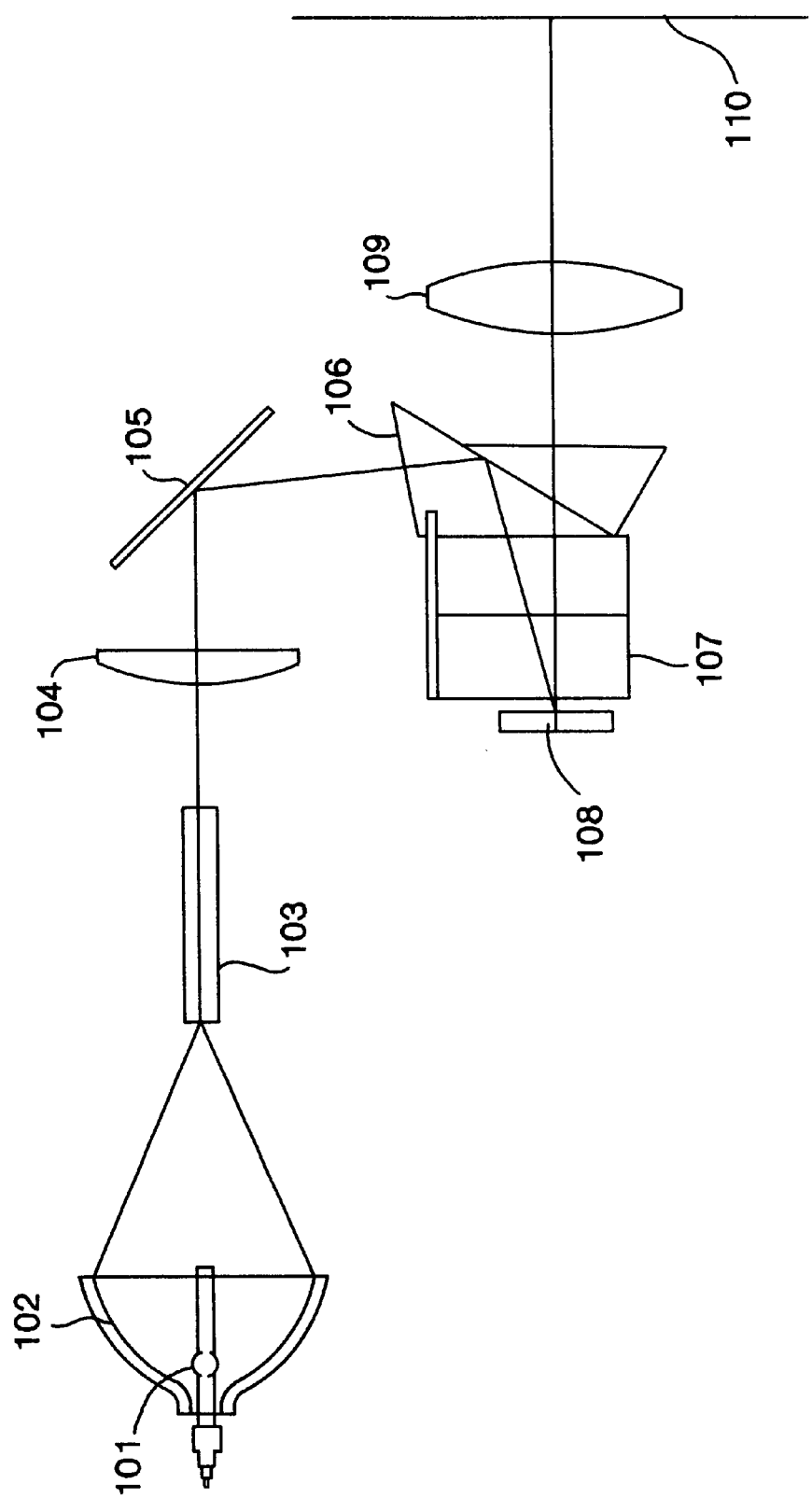
FIG. 1 is a diagram for showing a structure of a conventional projector device.
Figure 2:
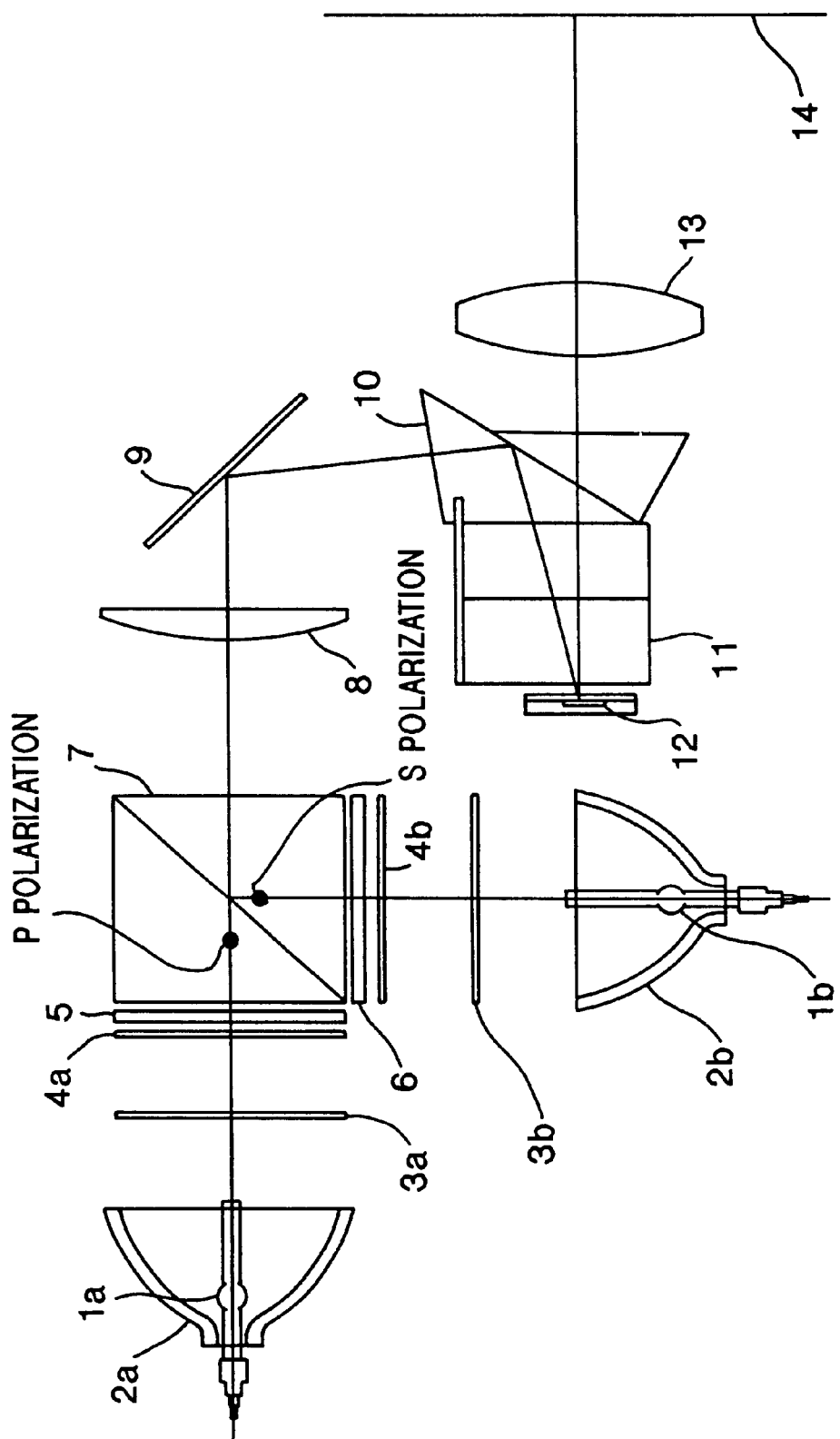
FIG. 2 is a diagram for typically showing a structure of the projector device for transmitting an exemplary one of three colors according to a first embodiment of the present invention.
Figure 3:
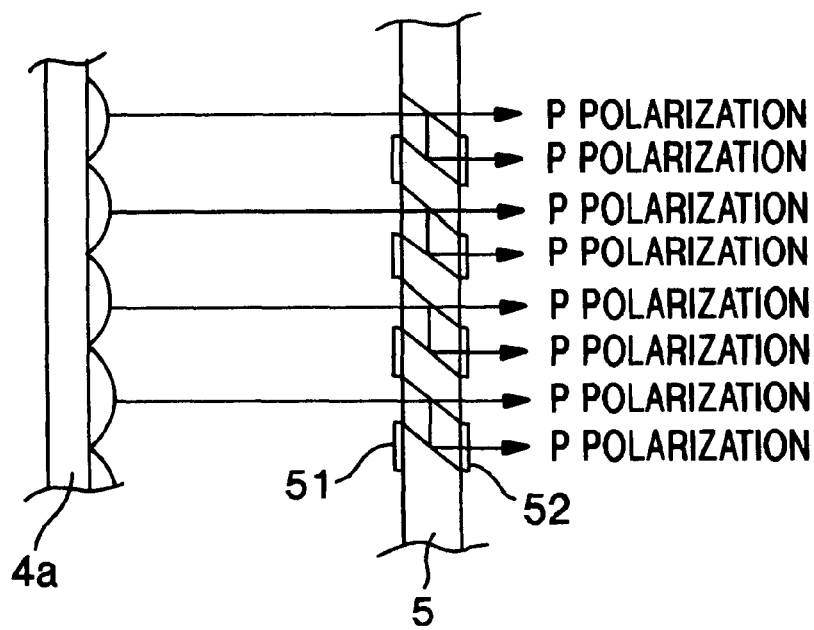
FIG. 3 is a diagram for typically showing a state of an incident light converted in the polarization converter of the projector device according to the first embodiment of the present invention.

FIG. 2 is a block diagram typically showing a structure of the projector device relating to the first embodiment. FIG. 3 and FIG. 4 are drawings showing a state in which light beams emitted from two light sources are polarized respectively before entering a polarization beam splitter. The block diagram shows an exemplary one of three optical paths, each path transmitting an individually associated one of three colors (red, green, and blue). Actually, after the light is split into its three primary colors, there are three, one for each of the three colors, mirror reflection type modulators (DMD) 12, although only one exemplary DMD is shown.

As shown in FIG. 2, the projector device according to the first embodiment, a light sources 1a, 1b equipped with reflecting mirrors 2a, 2b. While, in the present example, extra-high pressure mercury lamps of 150 W are used as the light sources 1a, 1b, other high luminance white color light sources such as a metal halide lamp, a xenon lamp, a halogen lamp and the like can be also used in addition. The light beams emitted from the light sources 1a, 1b are reflected by the reflecting mirrors 2a, 2b which are parabolic mirrors and changed into collimated light beams to enter fly's eye lenses 3a, 4a, 3b, 4b positioned in a running direction of the light beams. The fly's eye lenses 3a, 4a, 3b, 4b are constructed by combining a number of lens elements and, by being integrated into a luminous optical system, equalize the luminance of luminous light flux and condense light beams for polarization converters 5, 6 positioned next to them, resulting in having a facility to prevent a loss of light beams entering the polarization converters 5, 6.

The light beams coming out from the fly's eye lenses 3a, 4a, 3b, 4b are polarized by the polarization converters 5, 6 and the state thereof will be described in detail with reference to FIG. 3 and FIG. 4. First, as shown in FIG. 3, the polarization converter 5 into which the light beam enter from the left side of FIG. 2 is positioned in a running direction of the light beam from the light source 1a with a pair of a polarization plate 51 and a phase difference plate 52 placed in this order. The polarization plate 51 transmits through a "p" polarization ,and a "s" polarization has a facility to reflect.

Further, the phase difference plate 52 has a facility to shift a wavelength phase by ½ for a reflected as"s" polarization and the "s" polarization is polarization-converted into a "p" polarization by rotating a polarization direction of a light beam by 90°. In this way, it has a facility to convert an incoming light beam into a "p" polarization component and hence all the light beams transmitting through the polarization converter 5 come out as the "p" polarization.

Figure 4:
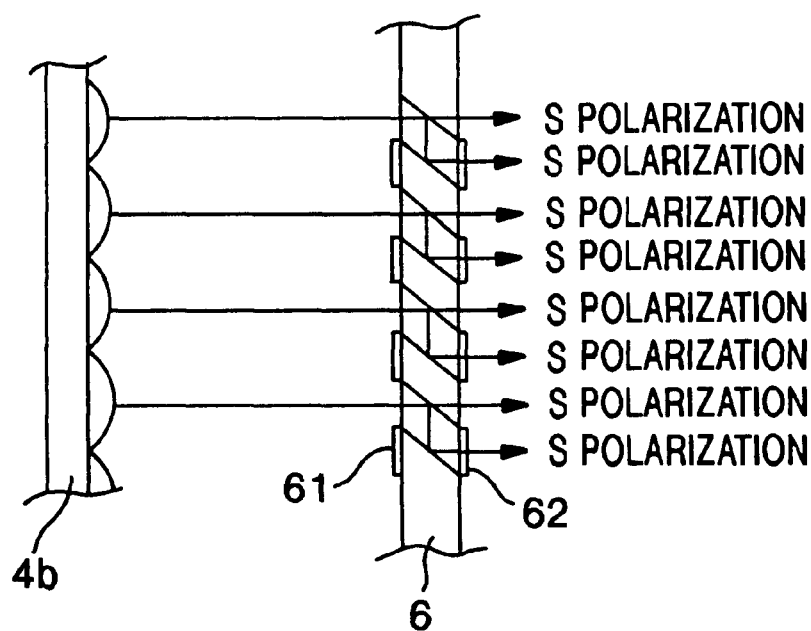
FIG. 4 is a diagram for typically showing a state of an incident light converted in the polarization converter of the projector device according to the first embodiment of the present invention.

Similarly, as shown in FIG. 4, in the polarization converter 6 comprising a pair of a polarization plate 61 and a phase difference plate 62, the polarization plate 61 transmits through the "s" polarization and the "p" polarization has a facility to reflect. The reflected "p" polarization is polarization-converted into the a "s" polarization by shifting a wavelength phase by ½ by the phase difference plate 62. In this way, the polarization converter 6 has a facility to convert an incoming light beam into a "s" polarization component and all the lights transmitting through the polarization converter 6 come out as the as "s" polarization.

The above described polarized light beams from two directions enter a polarization beam splitter 7. However, since the polarization beam splitter 7 transmits through the "p" polarization component and the "s" polarization component has a facility to reflect, a light beam emitted from a luminance 1a is transmitted and a light beam emitted from a luminance 1b is reflected, thereby the light beams from the two directions are synthesized without attenuation. The polarization beam splitter 7 has such a structure that derivative multilayer films are deposited and clad on slant faces of two rectangular prisms.

The light beams synthesized by the polarization beam splitter 7 are condensed by a relay lens 8 and reflected by a reflecting mirror 9 and ,thereafter, vertically enter a reflecting prism 10. The light beams entering the reflecting prism 10 are fully reflected and thereafter , enter a color prism 11 and are color-separated into red, green and blue thereby irradiating three DMDs corresponding to respective colors.

Note that the relay lens 8 is for the purpose of effectively condensing a light beam into a DMD 12, and the reflecting mirror 9 is positioned at a predetermined angle with an optical axis so that the light beam vertically enters the reflecting prism 10. Further, the reflecting prism 10 has a facility to guide an incoming light beam to the DMD at a predetermined angle. The reflecting prism is constructed by two wedge type prisms combined together and there is disposed an air gap in each joint plane so as to bring about a full reflection of the light beam. The adequate amount for the air gap thereof is around 10 μm.

Further, a color separation of red, green and blue is performed in the color prism 11, and each color of red, green and blue of the DMD 12 is irradiated by light beams separated into respective colors. The color prism 11 is constructed by three wedge type prisms combined together and there is applied in each joint plane a coating for transmitting through or reflecting a predetermined color.

In the DMD 12, only the three light beams (red, green, and blue) necessary for a predetermined picture are reflected in a direction of a screen 14 and synthesized when passing through the color prism again to become a predetermined picture and pass through said reflecting prism 10. The DMD has a facility in which unnecessary light beams are reflected in a downward direction of the drawing of the color prism 11 and not projected onto the screen 14. A projector lens 13 magnifically projects a picture reflected by the DMD 12 onto the screen 14 and is equipped with a focusing adjustment facility for performing focusing adjustment of a projected picture. Note that a zooming mechanism for changing a size of the picture may be added without changing a projection distance.

In this manner, the projector device according to the present example provides two light source systems and polarizes the light beams of respective light sources into a "p" polarization and a "s", polarization respectively by the polarization converter. Since the light beams of the two systems are synthesized by the polarization beam splitter, the luminance of the synthesized light beams can be increased without attenuating the luminance of each light source. Accordingly, brighter luminance than usual can be obtained without using high output light sources.

Next, the projector device according to a second embodiment of the present invention will be described with reference to FIG. 5.

Figure 5:
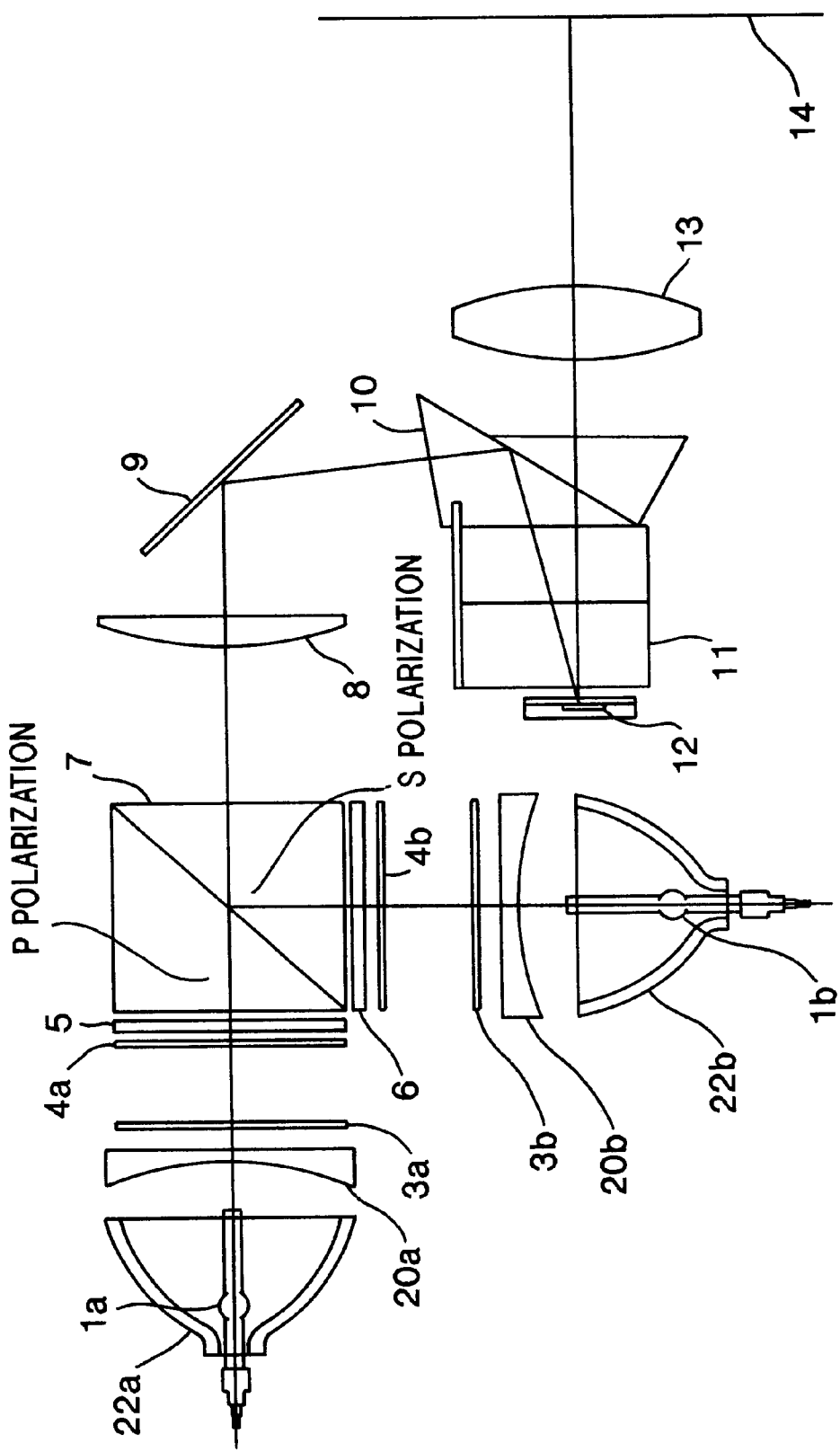
FIG. 5 is a diagram for typically showing a structure of the projector device according to a second embodiment of the present invention. Similar light paths are provided for the other two colors, as required, after the light is split into its three primary colors.

FIG. 5 is a block diagram typically showing a structure of the projector device according to the second embodiment. Different from the first embodiment as described above, the second embodiment is characterized in that a collimated light beam is formed by positioning a concave lens in front of a reflecting mirror.

As shown in FIG. 5, in the projector device according to the second embodiment, the light beams emitted from the light sources 1a, 1b are reflected by the reflecting mirrors 22a, 22b and , thereafter, enter concave lens 20a, 20b to become collimated light beams and enter the fly's eye lenses 3a, 3b. Similar to the first example as described above, the lights emitted from the fly's eye lenses 3a, 3b are polarized into a "p" polarization in case of the light beam from the light source 1a and a "s" polarization in case of the light beam from the light source 1b.

In this manner, the polarized light beams from the two directions enter the polarization beam splitter 7, transmit through a "p" polarization component and reflect a "s" polarization component, thereby synthesizing the light beams from the light sources 1a, 1b without large attenuation induced. The light beams synthesized by the polarization beam splitter 7 are condensed into a relay lens 8 and reflected by the reflecting mirror 9 and, thereafter, enter the DMD 12 through the reflecting prism 10.

In the DMD 12, only the light beams necessary for a predetermined picture are reflected in a direction of the screen 14 and synthesized when passing through the color prism 11 again to become a predetermined picture and pass through said reflecting prism 10.

In the second embodiment also, similar to the first embodiment as described above, the intensity of the synthesized light beams can be increased without attenuating the light beams of respective light sources of the two systems. Hence, brighter luminance than usual can be obtained without using high output light sources.

As described above, the present invention is advantageously effective in that a projector device having brighter luminance than usual can be provided without using high output light sources, while bringing power consumption under control.

The reason is because the present invention employs two light sources with small output and, after each light beam emitted from there is polarized into a "p" polarization and a "s" polarization respectively, they are synthesized by a polarization beam splitter and this makes it possible to increase the intensity of the light beam without attenuating the light beams of respective light source.

Another advantageous effect of the present invention is that a capacity of a light source for lamp can be made small by using a small output light source and, as a result, a capacity of the device can be made small.

What is claimed is:

1. A projector device for magnifically projecting onto a screen a beam of light emitted from a light source which is irradiated at a mirror reflection type light modulator after being color-separated into three light beams of three primary colors respectively by a color prism and after respective light beams of the primary colors modulated in the mirror reflection type light modulator are synthesized by said color prism, wherein the projector device has two light source systems, a light beam of one light source system is polarized into a light beam composed of a single polarization component by a polarization converter constructed by a polarization plate and a phase difference plate opposed to each other, and a light beam of another light source system is polarized into a light beam which is 90° different in a polarizing direction from the light beam of said one light source, and the light beams of said two light source systems are synthesized by a polarization beam splitter.

2. A projector device for magnifically projecting onto a screen a beam of light emitted from a light source which is irradiated at a mirror reflection type light modulator after being color-separated into three light beams of three primary colors respectively by a color prism and after the respective light beams of the primary colors modulated in the mirror reflection type light modulator are synthesized; comprising at least:

two light sources; a polarization converter for polarizing light beams of respective light sources; and a polarization beam splitter for synthesizing polarized light beams of respective light sources, wherein a light beam emitted from a first light source transmits through said polarization beam splitter after being polarized into a "p" polarization by said polarization converter, a light beam emitted from a second light source is polarized into a "s" polarization by said polarization converter, and thereafter, light beams emitted from the two light sources are synthesized by said polarization beam splitter.

3. The projector device as claimed in claim 2, wherein said polarization converter is constructed by a polarization plate and a phase difference plate opposed to each other.

4. A projector device for magnifically projecting onto a screen a beam of light emitted from a light source which is irradiated at a mirror reflection type light modulator after being color-separated into three light beams of three primary colors respectively by a color prism and after the respective light beams of the primary colors modulated in the mirror reflection type light modulator are synthesized; comprising at least:

two light sources; two luminance regulators for equalizing the luminance of light flux of respective light sources; two polarization converters for polarizing light beams of respective light sources; and a polarization beam splitter for synthesizing polarized light beams of respective light sources, wherein a light beam of a first light source becomes an uniform light flux in a first luminance regulator and transmits through said polarization beam splitter after being polarized into a "p" polarization by a first polarization converter, a light beam of a second light source becomes an uniform light flux in a third luminance regulator, and after being polarized into a "s" polarization, light beams emitted from the two light sources are synthesized by said polarization beam splitter.

5. The projector device as claimed in claim 4, wherein said polarization converter is constructed by a polarization plate and a phase difference plate opposed to each other.

6. The projector device as claimed in claim 4, wherein said luminance regulator comprises fly's eye lenses constructed by a number of lens elements.

7. A projector device for magnifically projecting onto a screen a beam of light emitted from a light source which is irradiated at a mirror reflection type polarization light modulator after being color-separated into three light beams of three primary colors respectively by a color prism and after the respective light beams of the primary colors modulated in the mirror reflection type light modulator are synthesized; comprising at least:

two light sources; two lens portions for making light beams emitted from respective light sources into collimated light beams; two luminance regulators for equalizing the luminance of light flux of respective light sources; two polarization converters for polarizing light beams of respective light sources; and a polarization beam splitter for synthesizing polarized light beams of respective light sources, wherein a light beam emitted from a first light source and changed into a collimated light beam in a first lens portion becomes an uniform light flux in a first luminance regulator and transmits through said polarization beam splitter after being polarized into a "p" polarization by a first polarization converter, a light beam emitted from a second light source and changed into a collimated light in a second lens portion becomes an uniform light flux in a second luminance regulator, and after being polarized into a "s" polarization by a second polarization converter, light beams emitted from the two light sources are synthesized by said polarization beam splitter.

8. The projector device as claimed in claim 7, wherein said polarization converter is constructed by a polarization plate and a phase difference plate opposed to each other.

9. The projector device as claimed in claim 7, wherein said luminance regulator comprises fly's eye lenses constructed by a number of lens elements.

* * * * *